(12) United States Patent
Suzuki

(10) Patent No.: US 12,223,809 B1
(45) Date of Patent: Feb. 11, 2025

(54) SETTLEMENT TERMINAL

(71) Applicant: TOSHIBA TEC KABUSHIKI KAISHA, Tokyo (JP)

(72) Inventor: Kenya Suzuki, Kamo Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/664,328

(22) Filed: May 15, 2024

(30) Foreign Application Priority Data

Nov. 7, 2023 (JP) .................. 2023-190058

(51) Int. Cl.
*G07G 1/00* (2006.01)
*G07G 1/01* (2006.01)

(52) U.S. Cl.
CPC ......... *G07G 1/0018* (2013.01); *G07G 1/0045* (2013.01); *G07G 1/01* (2013.01)

(58) Field of Classification Search
CPC ....... G07G 1/0018; G07G 1/0045; G07G 1/01
USPC ............................................. 235/383
See application file for complete search history.

(56) References Cited

U.S. PATENT DOCUMENTS

| | | |
|---|---|---|
| 11,922,389 B2 | 3/2024 | Kida et al. |
| 2016/0070964 A1* | 3/2016 | Conrad ................ G07G 1/0018 348/150 |
| 2019/0066076 A1* | 2/2019 | Lee ...................... G07G 1/0018 |

* cited by examiner

*Primary Examiner* — Daniel A Hess
(74) *Attorney, Agent, or Firm* — Amin, Turocy & Watson, LLP

(57) ABSTRACT

A settlement terminal in which a customer can achieve a code settlement by holding a settlement tool on which a code symbol is displayed over and toward a display panel is provided. The settlement terminal according to an embodiment includes the display panel and an imaging unit. The display panel can be set to a transmissive state in at least partial area. The imaging unit is located at a reverse side of the display panel, and images the code symbol held over and toward the display panel through the area in the transmissive state of the display panel.

20 Claims, 4 Drawing Sheets

SETTLEMENT TERMINAL

CROSS-REFERENCE TO RELATED APPLICATION

This application is based upon and claims the benefit of priority from Japanese Patent Application No. 2023-190058, filed on Nov. 7, 2023, the entire contents of which are incorporated herein by reference.

FIELD

An embodiment of the present disclosure relates to a settlement terminal.

BACKGROUND

In recent years, since diversity in settlement means increases, use of a settlement terminal which deals with multiple settlement increases. For example, a single settlement terminal is provided with a contactless IC credit settlement function, an electronic money settlement function, and a code settlement function with reading of a code symbol such as a barcode or a QR code (registered trademark) in some cases.

Further, in such a settlement terminal, there is provided a display panel on a front surface in some cases. In the past, in general, in the settlement terminal provided with the display panel, the position where the contactless IC credit and the electronic money can be read and the position where the code symbol can be read are different from each other. For example, when using the contactless IC credit settlement function and the electronic money settlement function, it is the mainstream for a customer to touch a display panel at the center of the settlement terminal with a settlement tool such as a card or a smartphone, but in contrast, when using the code settlement function, the customer is required to hold the settlement tool over an imaging unit located at an end of the settlement terminal. Therefore, in the code settlement, the customer is interrupted by searching for the reading position, or suffers inconvenience therefrom in some cases.

DETAILED DESCRIPTION

A problem to be solved by the present disclosure is to provide a settlement terminal in which the customer can achieve the code settlement by holding the settlement tool on which the code symbol is displayed over and toward a display panel.

A settlement terminal according to an embodiment includes a display panel and an imaging unit. The display panel can be set to a transmissive state in at least partial area. The imaging unit is located at a reverse side of the display panel, and images a code symbol held over and toward the display panel through the area in the transmissive state of the display panel.

Embodiment

A settlement terminal according to the embodiment will hereinafter be described with reference to the drawings. It should be noted that the embodiment hereinafter described is one embodiment of the settlement terminal, but does not at all limit the configuration, the specification, and so on of the settlement terminal. The present embodiment is an application example to a settlement terminal which is installed in a retail store (a store) such as a supermarket or a convenience store to perform a settlement of a transaction.

Figure 1:
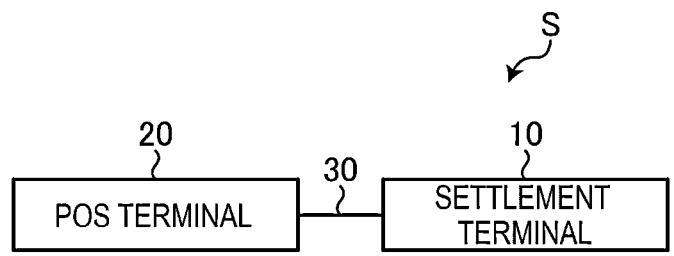
FIG. 1 is a diagram showing an example of a configuration of a settlement system according to the embodiment.

FIG. 1 is a diagram showing an example of a configuration of a settlement system S according to the present embodiment. The settlement system S is a system which sells an article sold in the store, and performs the sales management of the sold article and so on, and is mainly installed in the store. As shown in FIG. 1, the settlement system S is provided with a POS (Point of Sale) terminal 20 and a settlement terminal 10. The POS terminal 20 and the settlement terminal 10 are coupled to each other with a cable 30 so as to be able to communicate with each other. It should be noted that the POS terminal 20 and the settlement terminal 10 may wirelessly be coupled to each other.

The POS terminal 20 is a device for executing sales registration processing and settlement processing with respect to an article. The POS terminal 20 performs the settlement processing of a transaction in tandem with the settlement terminal 10. The POS terminal 20 may be an attended cash register, or may also be an unattended cash register. The attended cash register is a cash register in which a sales clerk intervenes in the registration of an article to be purchased by a customer or the settlement. For example, an ordinary POS cash register, a face-to-face POS cash register, and a semi-self-service cash register are each an example of the attended cash register. The ordinary POS cash register is a cash register in which the sales clerk who faces a customer performs the registration of the article and the settlement. The face-to-face POS cash register is a cash register in which the sales clerk who faces a customer performs the registration of the article, and the customer performs the settlement. The semi-self-service cash register is a cash register having a configuration in which the sales clerk facing the customer performs the registration of the article with a registration machine, and the customer performs the settlement (checkout) with a payment machine configured as a separate body from the registration machine. The unattended cash register is a cash register in which a customer performs the registration of an article to be purchased by the customer and the settlement by him- or herself. For example, a full-self-service cash register is an example of the unattended cash register.

The settlement terminal 10 is a multi-settlement terminal provided with a plurality of settlement functions. More particularly, the settlement terminal 10 is provided with at least one settlement function using a contactless reading device in addition to the code settlement function. In the present embodiment, the settlement terminal 10 is provided with the contactless IC (integrated Circuit) credit settlement function, the electronic money settlement function, and the code settlement function with reading of a code symbol such as a barcode or a QR code (registered trademark) (a two-dimensional code). It should be noted that the settlement terminal 10 may further be provided with other settlement functions such as a credit settlement function of a magnetic type or a plug-in type. The user of the settlement terminal 10 is a customer of a transaction as a settlement target.

Figure 2:
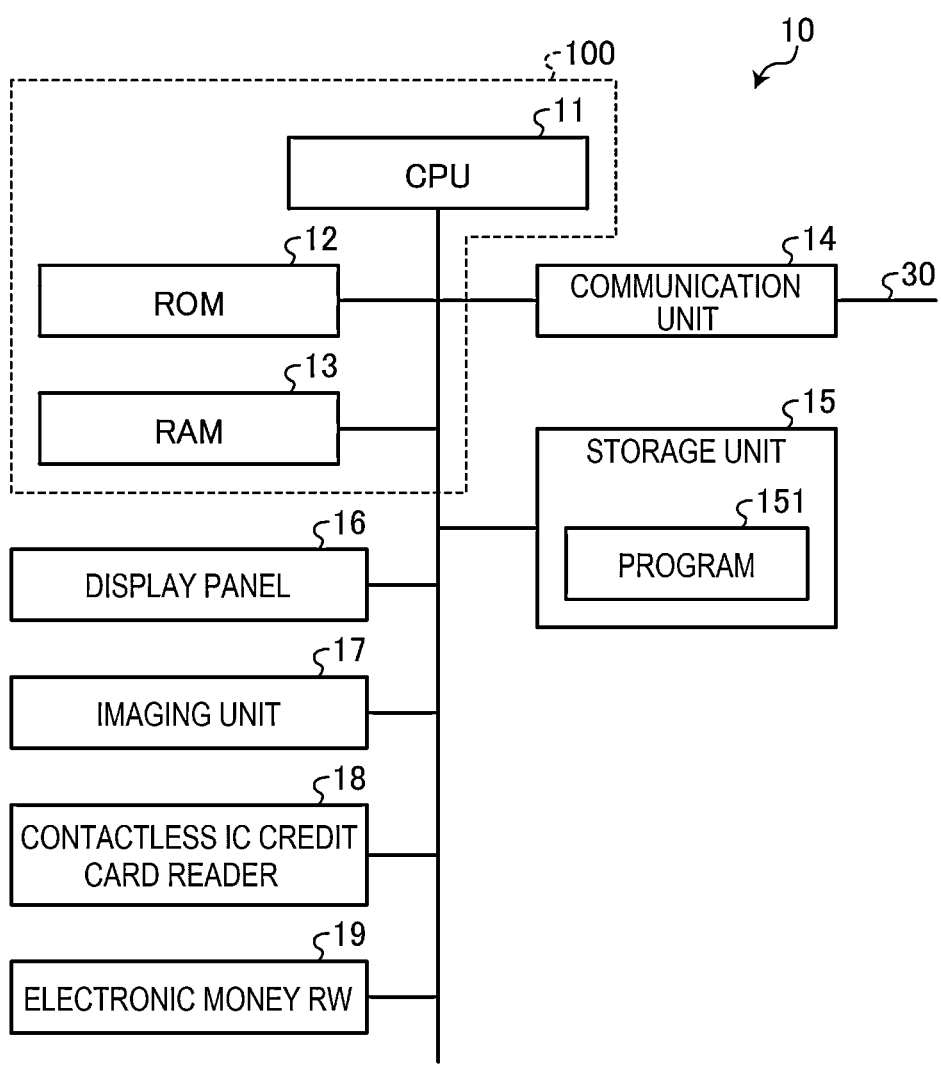
FIG. 2 is a diagram showing an example of a functional configuration of a settlement terminal according to the embodiment.

FIG. 2 is a diagram showing an example of a functional configuration of the settlement terminal 10 according to the present embodiment. As shown in FIG. 2, the settlement terminal 10 is provided with a central processing unit (CPU) 11, a read only memory (ROM) 12, a random access memory (RAM) 13, a communication unit 14, a storage unit 15, a display panel 16, an imaging unit 17, a contactless IC credit card reader 18, and an electronic money reader writer 19.

The CPU 11 is an example of a processor, and integrally controls each unit of the settlement terminal 10. The ROM 12 stores a variety of programs. The memory 13 is a work space in which the programs and a variety of types of data are developed.

The CPU 11, the ROM 12, and the RAM 13 are coupled to each other via a bus or the like to constitute a control unit 100 of a computer configuration. In the control unit 100, the CPU 11 operates with the program which is stored in the ROM 12 or the storage unit 15, and is developed in the RAM 13 to thereby execute a variety of types of processing. The control unit 100 is capable of switching the display panel 16 between a transmissive state and a non-transmissive state. Further, the control unit 100 controls the display panel 16 to display a variety of messages and images.

The transmission unit 14 is a communication interface capable of communicating with the POS terminal 20 via the cable 30.

The storage unit 15 is a nonvolatile storage device which includes a storage medium such as an HDD (Hard Disk Drive) or a flash memory, and keeps the storage content even when powered off. The storage unit 15 stores a program 151 which the CPU 11 can execute, and a variety of types of configuration information.

The display panel 16 is a display capable of displaying a variety of types of information, and is capable of setting at least a partial area to a transmissive state. The area in the transmissive state of the display panel 16 is not required to be completely transparent, and it is sufficient that it is possible for the imaging unit 17 described later to read a code symbol through the area in the transmissive state. Further, the display panel 16 may set the entire area to the transmissive state. The method of providing the display panel 16 with the area in the transmissive state is not particularly limited, and a known technique can be applied thereto. Specifically, as the display panel 16, there can be applied a transmissive organic EL (Electro Luminescence) display, a transmissive inorganic EL display, a transmissive LCD (liquid crystal) display, or the like. Further, it is possible to adopt a system in which an image is projected from the outside of the display of the display panel 16. Further, as the display panel 16, there can be adopted a technique in which the display panel 16 is switched between the transmissive state and the non-transmissive state in accordance with whether the display panel 16 is energized. The display panel 16 may be called a transparent display, a see-through panel, or a transparent screen. The display panel 16 displays a variety of types of information under the control of the control unit 100.

The imaging unit 17 is a digital camera having an imaging element such as a CCD (Charge Coupled Device) or a CMOS (Complementary Metal Oxide Semiconductor). The imaging unit 17 executes reading of a code symbol such as a barcode or a QR code displayed on, for example, a smartphone when performing the code settlement processing under the control of the control unit 100. Further, the imaging unit 17 may be a scanner specialized in reading the code symbol.

The contactless IC credit card reader 18 reads the contactless IC credit card incorporating an IC chip to execute a so-called touch settlement.

The electronic money reader writer 19 performs reading and writing of the prepaid electronic money registered in a card or a mobile electronic device.

The settlement terminal 10 is not necessarily required to be provided with both the contactless IC credit card reader 18 and the electronic money reader writer 19, but is required to be provided with at least either one thereof.

In the present embodiment, the card, the smartphone, and so on to be held over or touched on the settlement terminal 10 for the settlement processing are collectively referred to as settlement tools. The settlement tool is sufficiently a tool available for the contactless settlement method, and may further include a smart watch and so on.

It should be noted that a hardware configuration of the settlement terminal 10 is not limited to the example shown in FIG. 2, and the settlement terminal 10 may further be provided with other constituents. For example, the settlement terminal 10 may be provided with a magnetic card reader writer, a plug-in credit card reader, a printer for issuing a settlement result with a paper receipt, a speaker capable of outputting a sound, and so on.

Figure 3:
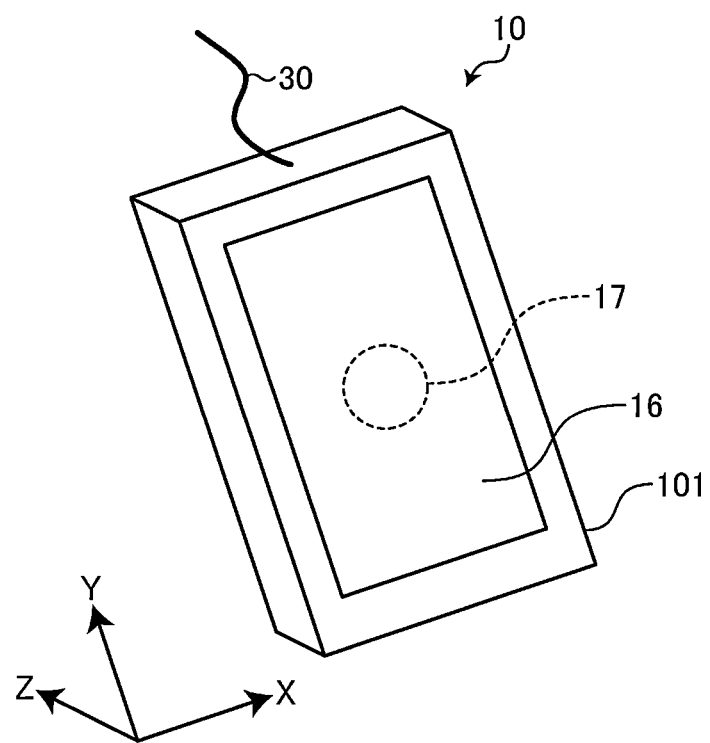
FIG. 3 is a diagram showing an example of an appearance of the settlement terminal.

Then, an appearance configuration of the settlement terminal 10 will be described. FIG. 3 is a diagram showing an example of an appearance of the settlement terminal 10 according to the present embodiment. An end portion of the settlement terminal 10 is provided with the cable 30 to be coupled to the POS terminal 20.

In the present embodiment, an end portion of the settlement terminal 10 at a side at which the cable 30 is disposed is referred to as a back side, and an opposite side to the side at which the cable 30 is disposed is referred to as a front side. The front side of the settlement terminal 10 is directed to the customer who uses the settlement terminal 10.

A chassis 101 of the settlement terminal 10 has a rectangular solid shape, and a direction (Y direction) from the front side toward the back side is the longitudinal direction.

As shown in FIG. 3, in the settlement terminal 10 according to the present embodiment, the display panel 16 is disposed on one surface of the chassis 101 having the rectangular solid shape. More particularly, the display panel 16 is disposed on, for example, an upper surface of the chassis 101 as shown in FIG. 3, and has a rectangular shape setting the longitudinal direction to the Y direction and the transverse direction to an X direction crossing the Y direction. In other words, the settlement terminal 10 has a vertically elongated rectangular solid shape, and the display panel 16 has a vertically elongated rectangular shape.

A surface of the display panel 16, namely a surface facing toward the outside of the chassis 101, is the display surface. The imaging unit 17 is disposed at the reverse side of the display panel 16, namely inside the chassis 101.

More specifically, the imaging unit 17 is disposed at the reverse side of the display panel 16 inside the chassis 101, in an orientation in which the display panel 16 side faces to the imaging direction. The imaging unit 17 images the code symbol which is held over and toward the display panel 16 through the area in the transmissive state of the display panel 16.

In the example shown in FIG. 3, the imaging unit 17 is located at the reverse side of the center of the display panel 16. In this case, the imaging unit 17 is capable of reading the code symbol which is held over and toward the center of the display panel 16. It should be noted that the "center" in the present specification includes not only the complete center, but also a nearly central area.

Then, the display of the display panel 16 will be described. The control unit 100 makes the display configuration of the display panel 16 different between the code settlement and other settlement methods. More particularly, the control unit 100 sets the transmissive state in at least a partial area of the display panel 16 when performing the code settlement so that the imaging unit 17 can read the code symbol via the area in the transmissive state. Further, when a settlement method other than the code settlement is taken, the control unit 100 displays a message or an image on the entire screen of the display panel 16.

Figure 4:
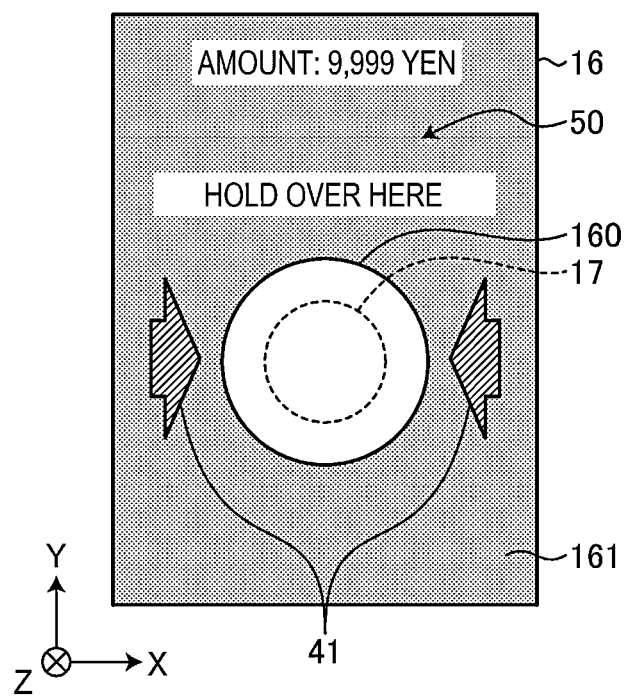
FIG. 4 is a diagram showing an example of display of a display panel when performing a code settlement according to the embodiment.

FIG. 4 is a diagram showing an example of the display of the display panel 16 when performing the code settlement according to the present embodiment. As shown in FIG. 4, when performing the code settlement, the control unit 100 provides a first area 160 in the transmissive state on the display panel 16. Neither characters nor images are displayed in the first area 160. In the present embodiment, the first area 160 is located at the center of the display panel 16, and the imaging unit 17 is located at the reverse side of the first area 160. A second area 161 surrounding the first area 160 is an area where a message and an image can be displayed. It should be noted that the second area 161 can be in a translucent state in which the reverse side can visually be recognized, or can also be in a non-transmissive state in which the reverse side cannot visually be recognized.

Further, in general, it is assumed that when a customer holds the smartphone over the settlement terminal 10, the customer makes the smartphone be opposed to the settlement terminal 10 with the respective longitudinal directions aligned with each other so to correspond the outer circumference of the smartphone to the outer circumference of the settlement terminal 10. Therefore, it is preferable for the position of the first area 160 to be the position where the imaging unit 17 can read the code symbol displayed at the center of the display of the smartphone, when the customer holds over the smartphone having a portrait-oriented display with a typical size so that the longitudinal direction of the smartphone is parallel to the longitudinal direction of the display panel 16 and the settlement terminal 10. For example, as shown in FIG. 4, by the first area 160 being located at the center of the display panel 16, alignment to be performed when the customer holds over the smartphone becomes easy.

Further, when performing the code settlement, the control unit 100 displays a message or an image for giving guidance of holding the code symbol over the area in the transmissive state at positions across the first area 160 in the transmissive state in at least a vertical direction or a horizontal direction in the display panel 16.

In the example shown in FIG. 4, the control unit 100 displays two first guide images 41 each having an arrow shape at positions across the first area 160 in the horizontal direction in the second area 161.

The first guide images 41 are images indicating the position where the code symbol is held over the display panel 16. The first guide images 41 shows the position where the code symbol is to be held over to the customer. The position where the code symbol is to be held over directly means the position which the imaging unit 17 can read, and specifically the position where the first area 160 in the transmissive state is disposed. The configuration of the first guide images 41 is not limited to the example shown in FIG. 4. For example, the "positions across the first area 160 in at least a vertical direction or a horizontal direction" include when the entire periphery of the first area 160 is surrounded. Therefore, it is possible for the control unit 100 to display the first guide image 41 having a shape surrounding the entire periphery of the first area 160. The first guide image 41 may have a linear shape, and may be, for example, a circle surrounding the entire periphery of the first area 160. Further, it is possible for the control unit 100 to perform dynamic display such as blink of the first guide image 41. It should be noted that the first guide image 41 may be referred to simply as a guide image.

In the present embodiment, since the reading position of the imaging unit 17 is included in the display panel 16, it becomes possible to dispose the first guide images 41 at positions across the reading position in the vertical direction or the horizontal direction on the display panel 16. As a comparative example, when the reading position of the imaging unit 17 is set outside the display panel 16, it is unachievable to set the positions across the reading position in the vertical direction or the horizontal direction in the display on the display panel 16.

Further, the control unit 100 displays a message 50 which gives the customer as the user the guidance of holding the code symbol over and toward the first area 160 in the second area 161 surrounding the first area 160, and an amount as the settlement target. It should be noted that the control unit 100 displays the first guide images 41 at the positions across the first area 160 in FIG. 4, but may display the message 50 and the first guide image 41 across the first area 160. Alternatively, the control unit 100 may display a plurality of the messages 50 across the first area 160.

Figure 5:
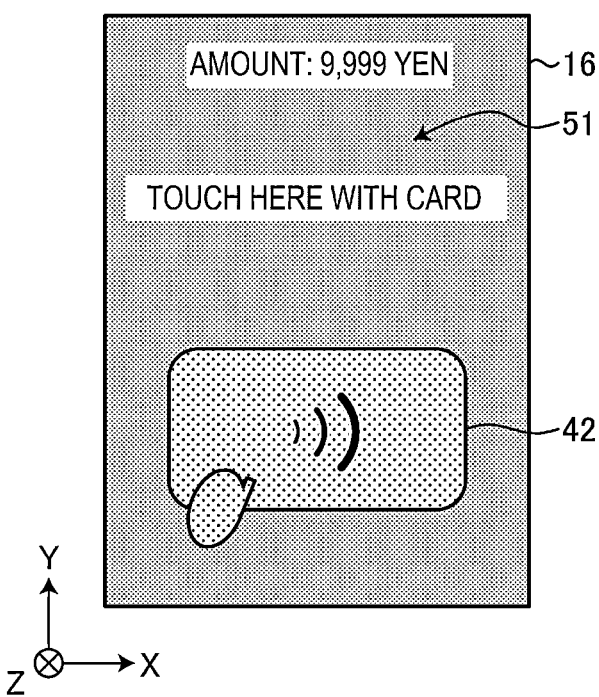
FIG. 5 is a diagram showing an example of display of the display panel when performing a contactless IC credit settlement according to the embodiment.

FIG. 5 is a diagram showing an example of the display of the display panel 16 when performing the contactless IC credit settlement according to the present embodiment. Since the reading by the imaging unit 17 is not executed when performing the contactless IC credit settlement, the first area 160 in the transmissive state is not required to be disposed. In the example shown in FIG. 5, the control unit 100 displays a second guide image 42, a message 51, and an amount as the settlement target on the entire screen of the display panel 16. In this case, the entire screen of the display panel 16 can be in the translucent state in which the reverse side can visually be recognized, or can also be in the non-transmissive state in which the reverse side cannot visually be recognized.

The content of the message 51 displayed on the display panel 16 when performing the contactless IC credit settlement is, for example, for giving guidance of touching the display panel 16 with the contactless IC credit card to the customer.

The second guide image 42 is an image which shows the position to be touched with the contactless IC credit card to the customer as the user. In the example shown in FIG. 5, the second guide image 42 is disposed at the center of the display panel 16.

It should be noted that although the illustration of the screen display of the display panel 16 when performing the electronic money settlement is omitted, the reading by the imaging unit 17 is not executed, and therefore, the first area 160 in the transmissive state is not required to be disposed similarly to when performing the contactless IC credit settlement. For example, when performing the electronic money settlement, the control unit 100 may display a guide image for introducing the position to be touched with the card of the electronic money or the smartphone to the customer as the user, a message of guiding the customer to make a touch with the card or the smartphone, and the amount on the display panel 16. The guide image when performing the electronic money settlement is also disposed at the center of the display panel 16 similarly to the second guide image 42 shown in FIG. 5.

As long as the position on the settlement terminal 10 where the settlement tool is held over when the customer uses the code settlement function, and the position on the settlement terminal 10 where the settlement tool is held over or touched when the customer uses other contactless settlement functions are the same as each other, the customer is not required to change the position of the settlement tool in accordance with the settlement method. In the example shown in FIG. 4 and FIG. 5, the position where the customer held over the smartphone when performing the code settlement, and the position which the customer touches with the card or the smartphone when performing the contactless IC credit settlement and the electronic money settlement are both the center of the display panel 16. Therefore, it is possible for the customer to perform the settlement operation by holding the settlement tool over the center of the display panel 16 or by touching the center of the display panel 16 with the settlement tool in any of the settlement methods.

In the present embodiment, the contactless IC credit card reader 18 and the electronic money reader writer 19 are disposed at positions where the settlement tool with which the position of the second guide image 42 disposed at the center of the display panel 16 is touched can be read.

Then, a flow of the processing to be executed in the settlement terminal 10 configured as described above will be described.

Figure 6:
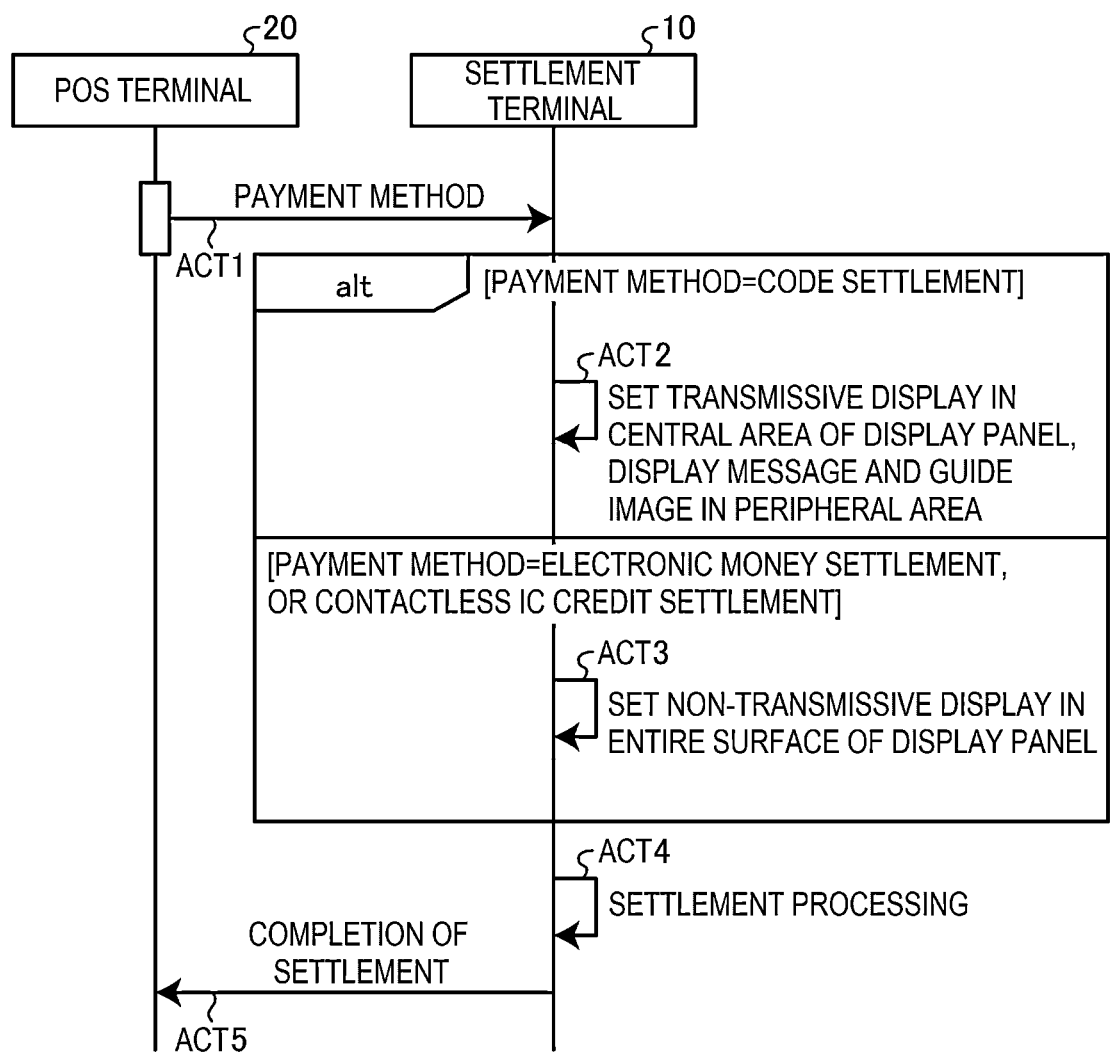
FIG. 6 is a sequence chart showing an example of a flow of processing in the settlement terminal.

FIG. 6 is a sequence chart showing an example of the flow of the processing in the settlement terminal 10 according to the present embodiment. The processing shown in FIG. 6 is included as a part of the settlement processing in the settlement system S. Prior to the processing shown in FIG. 6, execution of article registration processing and selection processing of the payment method in the POS terminal 20 is completed.

First, the communication unit 14 of the settlement terminal 10 receives (S1) a notice of the payment method from the POS terminal 20. Then, when the payment method is the code settlement, the control unit 100 of the settlement terminal 10 performs transmissive display in the central area (i.e., the first area 160) of the display panel 16, and displays (S2) the message 50 and the first guide images 41 in the peripheral area (i.e., the second area 161) as shown in FIG. 4.

Further, when the payment method is a method other than the code settlement such as the electronic money settlement or the contactless IC credit settlement, the control unit 100 of the settlement terminal 10 set the non-transmissive display in the entire surface of the display panel 16 to display (S3) the second guide image 42 for giving guidance of the electronic money settlement or the contactless IC credit settlement, and the message 51 as shown in FIG. 5.

Then, the control unit 100 of the settlement terminal 10 executes (S4) the settlement processing in accordance with the payment methods. After the completion of the settlement processing, the communication unit 14 of the settlement terminal 10 transmits (S5) a completion of the settlement to the POS terminal 20. The processing in the sequence chart is terminated here.

It should be noted that settlement processing with a payment method such as a cash settlement which the settlement terminal 10 does not deal with is omitted in the sequence chart in FIG. 6.

As described above, the settlement terminal 10 according to the present embodiment is provided with the display panel 16 capable of setting the transmissive state in at least a partial area, and the imaging unit 17 which is located at the reverse side of the display panel 16, and which images the code symbol held over and toward the display panel 16 through the area in the transmissive state of the display panel 16. Therefore, according to the settlement terminal 10 according to the present embodiment, it becomes possible for the customer to achieve the code settlement by holding the settlement tool on which the code symbol is displayed over and toward a display panel 16.

Further, the settlement terminal 10 according to the present embodiment displays the message or the image for giving guidance of holding the code symbol over the area in the transmissive state at positions across the first area 160 in the transmissive state in at least the vertical direction or the horizontal direction in the display panel 16. Therefore, according to the settlement terminal 10 related to the present embodiment, it is possible for the customer to easily figure out the position where the code symbol is held over.

Further, the display panel 16 of the settlement terminal 10 according to the present embodiment has the vertically elongated rectangular shape. Further, the area in the transmissive state is located at the center of the display panel 16. Therefore, according to the settlement terminal 10 related to the present embodiment, it is easy for the customer to align the smartphone with the reading position of the code symbol when the customer holds the smartphone on which the code symbol is displayed over the display panel 16.

Further, the settlement terminal 10 according to the present embodiment is capable of switching the display panel 16 between the transmissive state and the non-transmissive state. Therefore, according to the settlement terminal 10 related to the present embodiment, when executing the settlement processing with a function other than the code settlement function, it is possible to perform the display using the entire screen similarly to the normal display.

Further, the settlement terminal 10 according to the present embodiment is further provided with at least one of the contactless IC credit card reader 18 and the electronic money reader writer 19 in addition to the imaging unit 17 capable of reading the code symbol. The contactless IC credit card reader 18 and the electronic money reader writer 19 are capable of reading the contactless IC credit card or the electronic money which are held over the display surface side of the display panel 16. Therefore, according to the settlement terminal 10 related to the present embodiment, the position where the settlement tool is held over or touched becomes above the display panel 16 common to the plurality of settlement methods. Therefore, it becomes possible for the customer to perform the settlement by holding the settlement tool over the display panel 16 of touching the display panel 16 with the settlement tool even in the settlement methods different from each other, and thus, the complexity in operation is reduced.

Modified Example 1

In the embodiment described above, it is assumed that the first area 160 of the display panel 16 can be changed between the transmissive state and the non-transmissive state as shown in FIG. 4 and FIG. 5, but the first area 160 may always be in the transmissive state.

Further, in the embodiment described above, it is assumed that the entire display panel 16 can be changed between the transmissive state and the non-transmissive state, but it is sufficient to set the transmissive state in the area necessary for the imaging unit 17 to perform the imaging, and the other areas are not required to be set in the transmissive state. In other words, the area corresponding to the second area 161 shown in FIG. 4 may always be in the non-transmissive state.

Modified Example 2

Further, in the embodiment described above, it is assumed that both of the first area 160 in the transmissive state and the second area 161 in the non-transmissive state are disposed in the display panel 16 when performing the code settlement, but the entire surface of the display panel 16 may be in the transmissive state when performing the code settlement.

Modified Example 3

In the embodiment described above, it is assumed that the imaging unit 17 is disposed at the reverse side of the center of the display panel 16, but the position of the imaging unit 17 is not limited thereto. For example, the settlement terminal 10 may be provided with a mirror or the like, which projects the code symbol held over and toward the center of the display panel 16 toward the imaging unit 17, at the reverse side of the center of the display panel 16. In this case, the imaging unit 17 reads the code symbol via the mirror, and may therefore be disposed at a position shifted from the reverse side of the center of the display panel 16.

Modified Example 4

In the embodiment described above, there is described the example in which the settlement terminal 10 has the rectangular solid shape, and the display panel 16 is made parallel to the floor, but the shape of the settlement terminal 10 is not limited thereto. For example, the display panel 16 may be disposed so as to be perpendicular or oblique to the floor.

Further, it is assumed in the embodiment that the settlement terminal 10 has the vertically elongated rectangular solid shape in which the direction extending from the front to the back is the longitudinal direction, but it is possible to adopt a horizontally elongated rectangular solid shape in which the direction extending from the front to the back is the transverse direction. In this case, the display panel 16 also has a horizontally elongated rectangular shape in which the direction extending from the front to the back is the transverse direction.

Further, in the embodiment described above, it is assumed that the settlement terminal 10 is separated from the POS terminal 20, but it is possible for the chassis 101 of the settlement terminal 10 to be combined with a chassis of the POS terminal 20.

Modified Example 5

In the embodiment described above, the description is presented citing the payment processing as an example, but the settlement terminal 10 may be available for reading of a reward card or a point app of the smartphone. In this case, the imaging unit 17 executes reading (imaging) of a code symbol such as a barcode or a QR code displayed on, for example, the reward card or a screen of the point app of the smartphone.

Although some embodiments are described, these embodiments are illustrative only, but limiting the scope of the disclosure is not intended. These novel embodiments can be implemented with other various aspects, and a variety of omissions, replacements, and modifications can be made within the scope or the spirit of the present disclosure. These embodiments and the modifications thereof are included in the scope of the disclosure, and at the same time, included in the disclosure set forth in the appended claims and the equivalents thereof.

What is claimed is:

1. A settlement terminal, comprising:
    a display panel configured to set a transmissive state in at least a partial area; and
    an imaging component which is located at a reverse side of the display panel, and which is configured to image a code symbol held over and toward the display panel through an area in the transmissive state of the display panel.

2. The settlement terminal according to claim 1, further comprising:
    a controller configured to display a message or an image, which gives guidance of holding the code symbol over the area in the transmissive state, at positions across the area in the transmissive state in at least a vertical direction or a horizontal direction in the display panel.

3. The settlement terminal according to claim 1, wherein the display panel has a vertically elongated rectangular shape, and
    the area in the transmissive state is located in a central portion of the display panel.

4. The settlement terminal according to claim 1, further comprising:
    a change controller configured to change the display panel between the transmissive state and a non-transmissive state.

5. The settlement terminal according to claim 1, further comprising:
    at least one of a contactless IC (Integrated Circuit) credit card reader configured to read a contactless IC credit card held over a display surface side of the display panel, and an electronic money reader writer configured to read and write electronic money held over the display surface side of the display panel.

6. The settlement terminal according to claim 1, wherein the imaging component comprises at least one of a digital camera that executes reading of a barcode or a QR code displayed on a smartphone or a scanner that executes reading a code symbol.

7. The settlement terminal according to claim 1, wherein the settlement terminal is a self-service settlement terminal.

8. A method for a settlement terminal, comprising:
    setting a transmissive state in at least a partial area on a display panel; and
    imaging, by an imaging component which is located at a reverse side of the display panel, a code symbol held over and toward the display panel through an area in the transmissive state of the display panel.

9. The method according to claim 8, further comprising:
    displaying a message or an image, which gives guidance of holding the code symbol over the area in the transmissive state, at positions across the area in the transmissive state in at least a vertical direction or a horizontal direction in the display panel.

10. The method according to claim 8, wherein
the display panel has a vertically elongated rectangular shape, and
the area in the transmissive state is located in a central portion of the display panel.

11. The method according to claim 8, further comprising:
changing the display panel between the transmissive state and a non-transmissive state.

12. The method according to claim 8, further comprising:
at least one of reading a contactless IC credit card held over a display surface side of the display panel by a contactless IC (Integrated Circuit) credit card reader, and reading and writing electronic money held over the display surface side of the display panel by an electronic money reader writer.

13. The method according to claim 8, further comprising:
reading a barcode or a QR code displayed on a smartphone.

14. A settlement system comprising a Point of Sale terminal and a settlement terminal,
the settlement terminal comprising:
a display panel configured to set a transmissive state in at least a partial area; and
an imaging component which is located at a reverse side of the display panel, and which is configured to image a code symbol held over and toward the display panel through an area in the transmissive state of the display panel.

15. The settlement system according to claim 14, the settlement terminal further comprising:
a controller configured to display a message or an image, which gives guidance of holding the code symbol over the area in the transmissive state, at positions across the area in the transmissive state in at least a vertical direction or a horizontal direction in the display panel.

16. The settlement system according to claim 14, wherein
the display panel has a vertically elongated rectangular shape, and
the area in the transmissive state is located in a central portion of the display panel.

17. The settlement system according to claim 14, the settlement terminal further comprising:
a change controller configured to change the display panel between the transmissive state and a non-transmissive state.

18. The settlement system according to claim 14, the settlement terminal further comprising:
at least one of a contactless IC (Integrated Circuit) credit card reader configured to read a contactless IC credit card held over a display surface side of the display panel, and an electronic money reader writer configured to read and write electronic money held over the display surface side of the display panel.

19. The settlement system according to claim 14, wherein
the imaging component comprises at least one of a digital camera that executes reading of a barcode or a QR code displayed on a smartphone or a scanner that executes reading a code symbol.

20. The settlement system according to claim 14, wherein
the settlement terminal is a self-service settlement terminal.

* * * * *